O. SUTTER.
POTATO PICKER.
APPLICATION FILED OCT. 15, 1908.
944,111.
Patented Dec. 21, 1909.
3 SHEETS—SHEET 3.
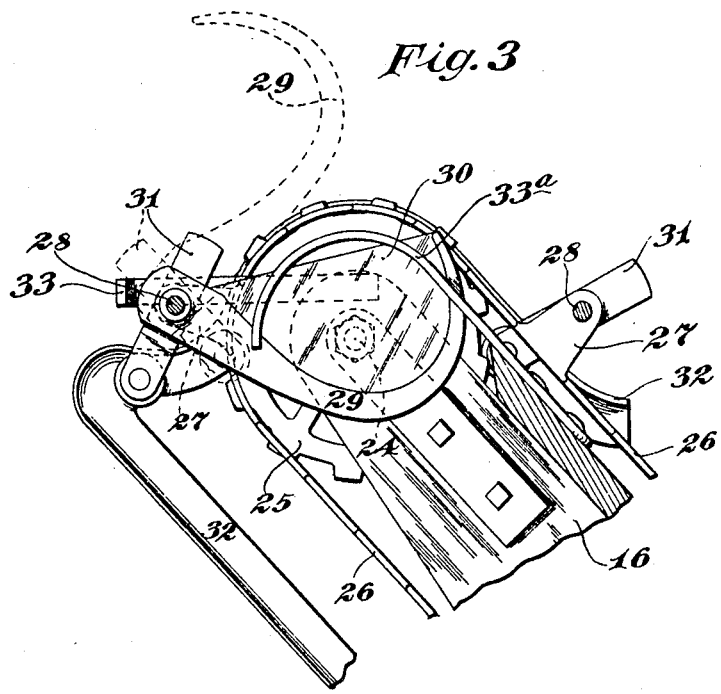
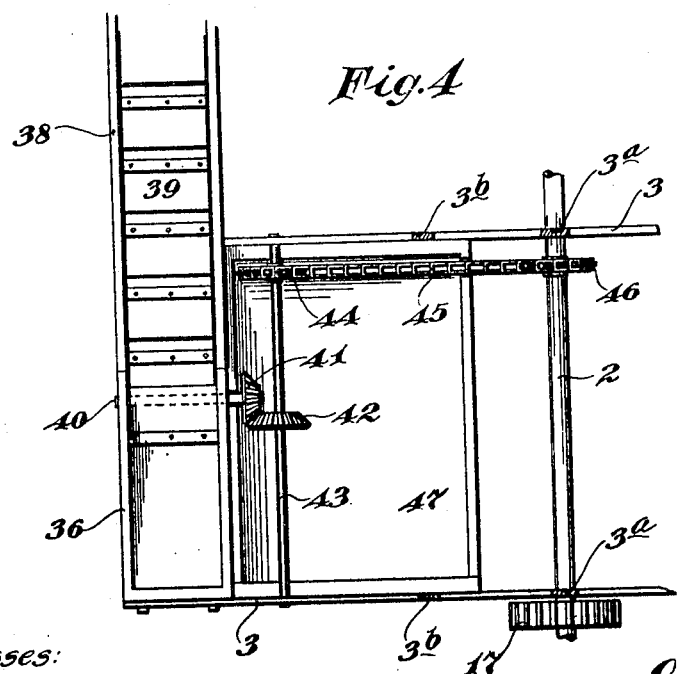
Witnesses:
L. L. Simpson.
Harry Opsahl.
Inventor:
Ole Sutter
By his Attorneys:
Williamson & Merchant

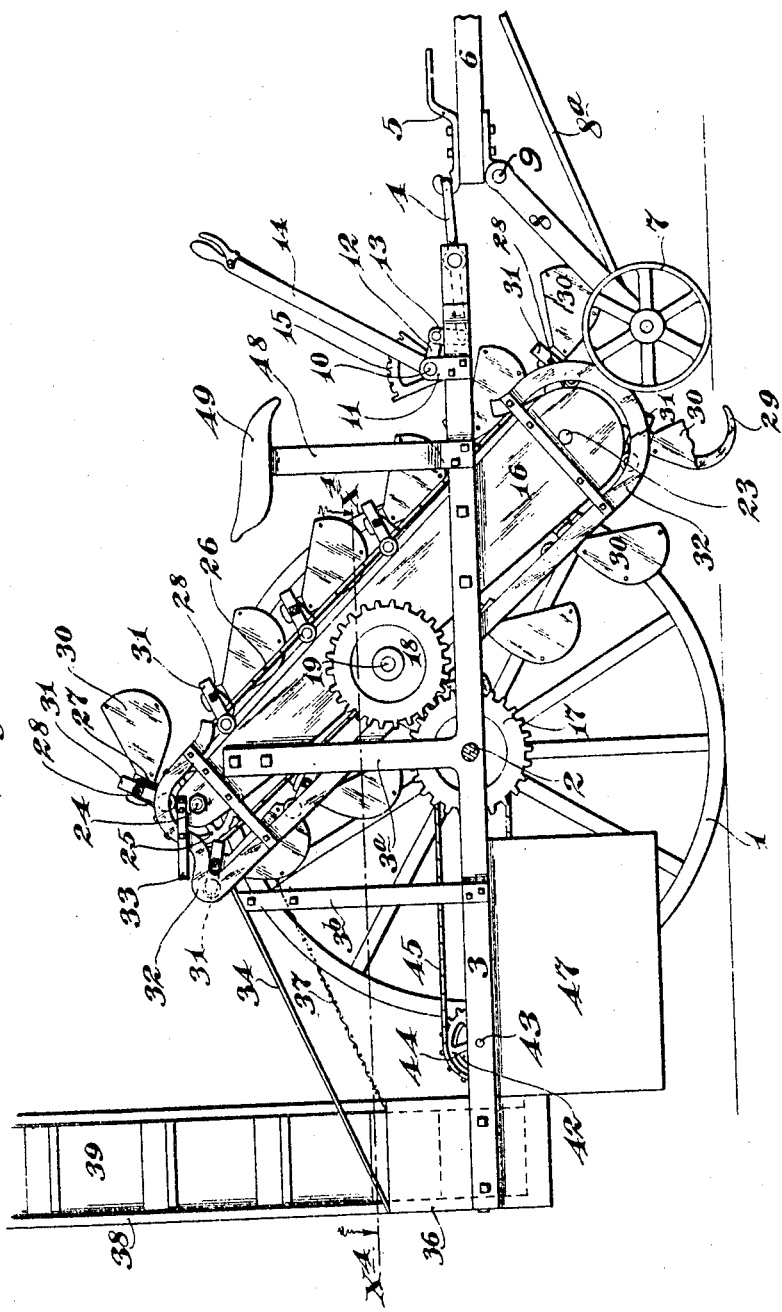

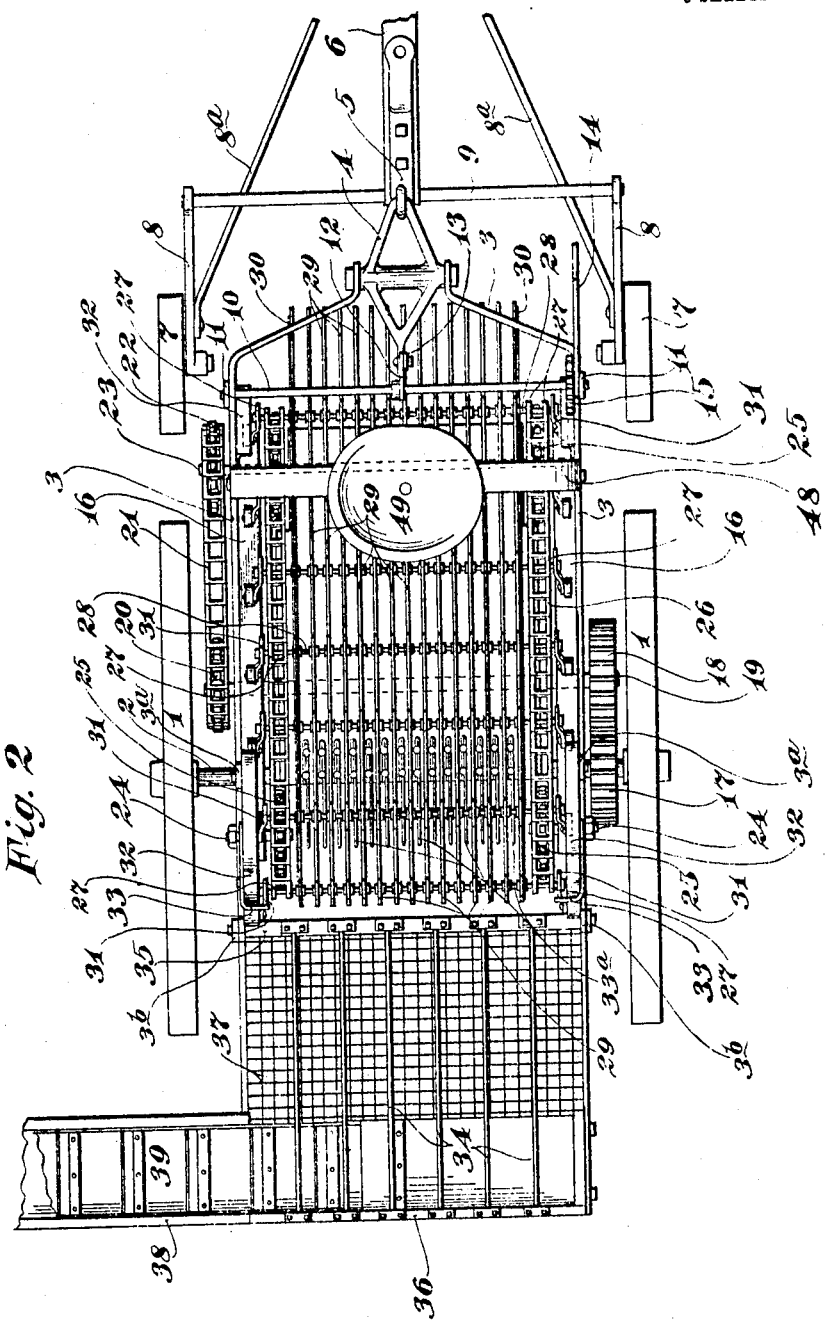

UNITED STATES PATENT OFFICE.

OLE SUTTER, OF ISANTI, MINNESOTA.

POTATO-PICKER.

944,111.   Specification of Letters Patent.   Patented Dec. 21, 1909.

Application filed October 15, 1908. Serial No. 457,848.

*To all whom it may concern:*

Be it known that I, OLE SUTTER, a citizen of the United States, residing at Isanti, in the county of Isanti and State of Minnesota, have invented certain new and useful Improvements in Potato-Pickers; and I do hereby declare the following to be a full, clear, and exact description of the invention, such as will enable others skilled in the art to which it appertains to make and use the same.

My invention has for its object to provide an efficient potato picker or machine adapted to pick up unearthed potatoes from the ground, elevate, clean and sort the same; and to these ends, my invention consists of the novel devices and combinations of devices hereinafter described and defined in the claims.

The invention is illustrated in the accompanying drawings, wherein like notations refer to like parts throughout the several views.

In said drawings; Figure 1 is a side elevation of the machine. Fig. 2 is a plan view of the same. Fig. 3 is a detail in longitudinal section through the upper end of the elevator, with some portions broken away, and others shown in elevation; and Fig. 4 is a detail, in horizontal section, substantially on the line $x^4$ $x^4$ of Fig. 1.

The numerals 1 represent the truck wheels, and the numeral 2 the axle of said truck, and the numeral 3 represents the main frame supported by the axle of said truck. The weight of the main frame 3, and all the parts carried thereby, is supported chiefly by the truck made up of the parts 1 and 2. The forward end of the main frame 3 is, however, connected by a pivoted draw bar 4 to a hook-shaped clip 5 fixed to the rear end of a draft pole 6, and, under the latter, is located a pilot truck 7 having its draw bars 8 rigidly connected to a cross rod 9 pivoted to the draft pole 6 and held by brace rods 8ª. Hence, the main frame 3 is held in a level position on the truck axle 2, and a small portion of the weight of this frame and parts carried thereby is taken on the pilot truck 7.

A rock shaft 10 is disposed crosswise of the main frame 3, near the forward end of the same, with its ends journaled in bearing brackets 11. This rock shaft 10 is provided with a crank arm 12 connected by link 13 with the rear end of the pivoted draw bar 4.

The rock shaft 10 is also provided with a spring pawl-equipped hand lever 14, the pawl of which is adapted to engage with lock segment 15 fixed to one of the bearing brackets 11 or the adjacent portion of the main frame 3, as shown in Fig. 1. Hence, with this hand lever 14 and the connections therefrom, the forward end of the main frame 3 may be lowered or raised in respect to the truck axle 2 and the rear end of the draft pole 6, as may be required for the desired actions of the machine.

On the main frame 3, is mounted an elevator frame 16 forward of the truck axle and extending in an inclined position from a point below the main frame 3 and near the pilot truck 7 to a point above and rearward of the said truck axle 2. This elevator frame 16 is shown as bolted to the side bars of the main frame 3 and to upright standards 3ª rising therefrom.

The truck axle 2 is provided with a gear wheel 17 which engages a similar gear wheel 18 on the right hand or adjacent end of a shaft 19 which is journaled in the elevator frame 16. The opposite end of the shaft 19 is provided with a sprocket wheel 20, which is connected by a chain 21 with a sprocket 22 on a shaft 23 located near the lower end of the elevator frame 16 and having its opposite ends journaled in the sideboards or plates thereof. Near the upper ends of the sideboards or plates of the elevator frame 16 are located a pair of stud shafts 24, one fixed to each of said sideboards, and on these stud shafts and the lower end shaft 23 are located four sprocket wheels 25, two thereof being on the said shaft 23, and one on each of the stud shafts 24. Mounted on these four sprocket wheels 25 are two link belt chains 26. At equal distances apart, the said chains 26 have bearing brackets 27 formed in their links, and the corresponding bracket lugs of the two chains are connected by cross rods 28. The parts 27 and 28 therefore serve to cross connect the two chains 26 and make up an endless conveyer mounted in the frame 16 and adapted to travel around the same under motion imparted thereto from the main truck through the parts marked 17, 18, 19, 20, 21 and 22, respectively.

The cross rods 28, connecting the chains 26, are journaled in the bearing brackets 27 of the chains, and have fixed thereto a series of scoop-shaped teeth 29 which are adapted to pick up the potatoes from the ground. Enough of the teeth 29 are placed on each of the rods 28 to prevent any but the smallest and most worthless potatoes from falling through between the said teeth. The end members of the series of teeth 29, on each of the rods 28, have fixed thereto end plates 30 which serve as guards to prevent the potatoes rolling off endwise from the bunch or series of teeth 29 on each rod 28. The rods 28 have fixed to the ends thereof roller-equipped lever arms 31 which are adapted to engage with and be controlled by fixed camways 32 which extend on the under side of the elevator frame 16, for its entire length, and also over-reach both the lower and the upper ends of the said frame. These camways 32 are so shaped that when engaged by the roller-equipped lever arms 31, they will hold the teeth 29 at the proper angle for the required picking up action on the potatoes; and, further, that they will turn the said teeth in the proper directions to hold the load of potatoes while the conveyer is traveling upward lengthwise of the elevator frame, until the potatoes are delivered as said teeth swing over the top of the elevator and then that they will coöperate with fixed trips 33 to throw the teeth backward suddenly from the positions shown in dotted lines in Fig. 3 to the positions shown in full lines in said view, the purpose of which will presently appear. The trips 33 are struck by the outer ends of the lever arms 31 while the roller-equipped ends of said levers are held by the camways 32; and, hence, the backward tilt of the teeth 29 is positively secured. This part of the elevator frame is also provided with clearing fingers 33ª in proper position to permit the teeth 29 to work downward through the same when being thrown backward from the dotted line position to the full line position shown in Fig. 3. Hence, the fingers 33ª, taken collectively, constitute a clearing comb for the teeth 29, thereby preventing any vines or other foreign materials from clinging thereto after the main load therefrom has been dumped and the teeth begin to assume their downward travel along the under side of the frame 16.

There are enough of the cross rods 28, and sets of teeth 29, to space the successive sets relative to each other in such a way that the entire surface of the ground will be picked over by the successive sets of teeth under the forward motion of the machine and the traveling motion of the endless conveyer, when the machine is properly set. Otherwise stated, the successive ground zones of action for the successive sets of teeth may be said to interlap at and slightly below the surface of the ground, so that no potato can escape being picked up, unless it lies considerably below the surface of the ground.

The forward end of the machine is preferably so set that the teeth 29 will enter the ground to the depth of two or three inches.

The elevator frame 16 is of skeleton form, and while the loaded teeth 29 are traveling upward lengthwise thereof, they rest on the deck of the elevator. From this relation of the parts, it follows, that from the time when the potatoes are picked up by the teeth 29 until the latter reach their dumping position, the dirt and other fine foreign materials, like small stones or gravel, are free to fall downward between the teeth 29. The vines, however, which may be picked up by the teeth, and any large sized stones or other foreign materials, will be carried up with the potatoes and delivered therewith over the upper end of the elevator. Hence, I provide sorting devices to separate these foreign materials from the potatoes, and the marketable from the under-sized and unmarketable stock of potatoes. For this purpose, I have shown a rod rack, made up of a series of rods 34 disposed on a downward incline extending from a point near the upper end of the elevator. As shown, the rods 34 have their upper ends fixed to a cross bar 35 supported by standards 3ᵇ rising from the side bars of the main frame 3, and have their lower ends secured to an end board 36 fixed to the side bars 3 of the main frame and extending crosswise of said frame at its rear end. The rods 34 are placed only close enough together to catch all the vines, weeds and other trash, while permitting all the potatoes to fall between the same. The potatoes are then caught on an underlying screen 37, suitably supported on an incline below the rod rack 34, and of such size and mesh as to retain all the marketable potatoes and only to pass through its meshes the potatoes which are too small for ordinary use. The potatoes caught and held by the screen 37 are directed to an elevator, the frame of which is marked 38. On this frame is mounted, in the customary or any suitable way, a slat and belt endless conveyer 39 mounted on suitable supporting rollers 40, only the lower member of which is shown. The roller 40 has a bevel gear 41 at its forward end which engages a similar gear 42 on cross shaft 43. The shaft 43 is journaled in side bars of the main frame 3 and has a sprocket 44 connected by chain 45 with a sprocket 46 on the truck axle 2; and, hence, through these connections, the slat and belt conveyer 39 will receive continuous motion from the truck axle. The elevator, made up of the parts 38 and 39, extends upward and outward at the proper angle for delivering the potatoes into a wagon, if the latter be made to travel side by side with the picker. The small potatoes, which pass through the meshed screen 37 will be caught by a receiving hopper 47 which is detachably supported from the main frame 3 of the machine, in any suitable way, so that it can be emptied from time to time, as required. The forward end of the main frame 3 is shown as spanned by a spring yoke 48 on which is mounted a driver's seat 49 in such location that the hand lever 14 will be within reach of the driver occupying said seat 49.

From the foregoing description, it will be seen that this machine is not a potato digger, but is a potato picker. It does not unearth or dig the potatoes, but picks up the potatoes which have been previously dug or unearthed by any other suitable means. Farmers have found from a large experience that, under all ordinary conditions, and especially if the ground is wet or even damp, it is better to first unearth the potatoes and let them lie for a time on the ground before undertaking to collect the same together. By thus allowing the potatoes to lie exposed to the sun for a time, the earth adhering to the potatoes will dry to such an extent that it will fall therefrom either before the potatoes are picked up, or after they are picked up and submitted to a shaking motion. The potatoes themselves also dry out to some extent on the surface, which puts the same in better condition for storage or collection into heaps.

This machine is especially adapted for use where the potatoes have been unearthed by a plow or plow-action potato digger, and the whole ground is left in a loose condition. It is not so well adapted for use where the potatoes have been in hills, spaced apart from each other, lengthwise of the row, and dug by hand, especially if the ground between the hills is hard. If the ground has been well cultivated and kept in a loose condition, this machine, however, will also do its intended work, even if the potatoes have been dug by hand.

By actual usage, I have demonstrated the efficiency of this machine for the purposes had in view. It will, of course, be understood that the details of the construction can be changed, without departing from the spirit of my invention.

What I claim is:—

1. A potato picker comprising a portable frame, an elevator frame carried thereby, an endless conveyer on said elevator frame having a pick-up device adapted to pick up the potatoes under the forward travel of the machine and the motion of said conveyer, a clearing device, and a cam to which said pick-up device is subject, for holding the same at the proper angles for picking up and dumping the potatoes at different points in the traveling movement of said conveyer and for throwing said pick-up device backward so that it will pass through said clearing device after the main load of the potatoes has been delivered, substantially as described.

2. In a potato picker, the combination with a portable frame, of an elevator frame carried thereby, a power-driven endless conveyer on said elevator frame having a series of pivoted cross rods, each provided with a series of scoop-shaped teeth for picking up the potatoes, a fixed camway, crank arms on said cross rods engageable with said camway for holding the said teeth at the proper angles for their desired actions, at different points of their travel, and a clearing comb at the delivery end of the elevator, between the teeth of which comb the said scoop-shaped teeth are thrown backward by said camway, for clearing the same of vines and other foreign materials, substantially as described.

3. In a potato picker, the combination with a portable frame, of the elevator 16 carried thereby, the power-driven endless conveyer supported by said frame and having the chains 26 with bearing brackets 27, the cross rods 28 pivoted in said brackets 27, the scoop-shaped teeth 29 fixed to said rods 28, the roller-equipped crank arms 31, the camways 32 and the trips 33, all for coöperation, substantially as described.

4. In a potato picker, the combination with a portable frame, of the elevator 16 carried thereby, the power-driven endless conveyer supported by said frame and having the chains 26 with bearing brackets 27, the cross rods 28 pivoted in said brackets 27, the scoop-shaped teeth 29 fixed to said rods 28, the roller-equipped crank arms 31, the camways 32, the trips 33 and the clearing comb 33ª, all for coöperation, substantially as described.

In testimony whereof I affix my signature in presence of two witnesses.

OLE SUTTER.

Witnesses:
B. C. SMITH,
F. ERICKSON.